Nov. 20, 1956 D. R. HINCHMAN 2,771,299
COMBINATION STOOL AND GAME CARRYING DOLLY FOR HUNTERS
Filed April 22, 1954 4 Sheets-Sheet 3
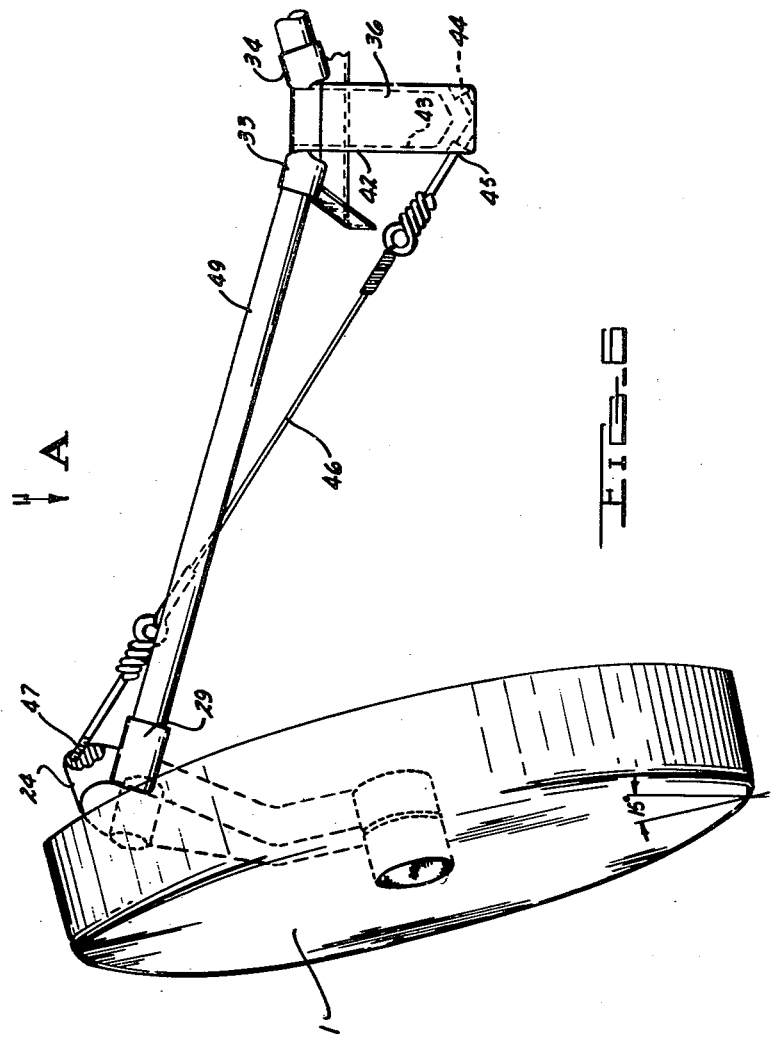
INVENTOR.
DIGBY R. HINCHMAN
BY
Smith, Olsen and Kittle
ATTORNEYS Nov. 20, 1956  D. R. HINCHMAN  2,771,299
COMBINATION STOOL AND GAME CARRYING DOLLY FOR HUNTERS
Filed April 22, 1954  4 Sheets-Sheet 4
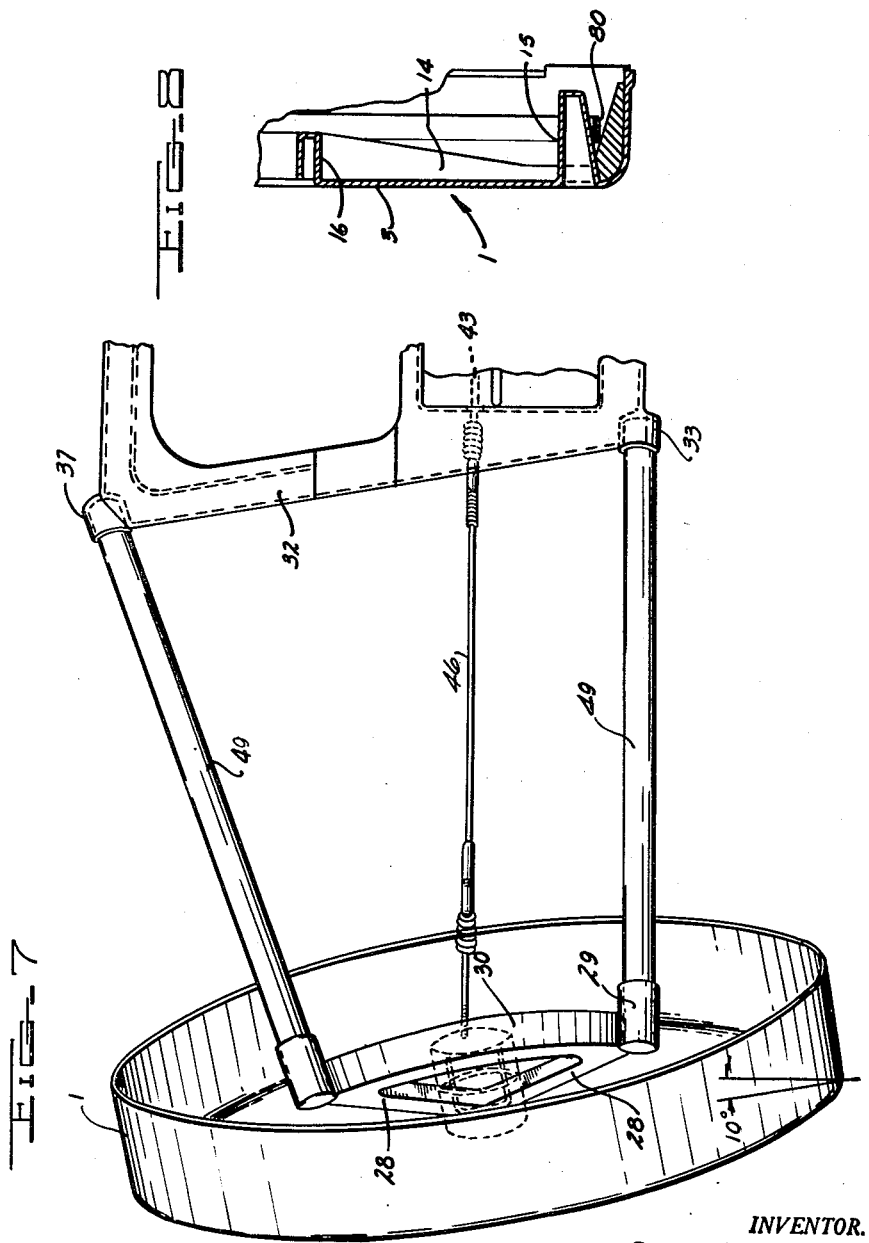
INVENTOR.
DIGBY R. HINCHMAN
BY
Smith, Olsen and Kotter
ATTORNEYS

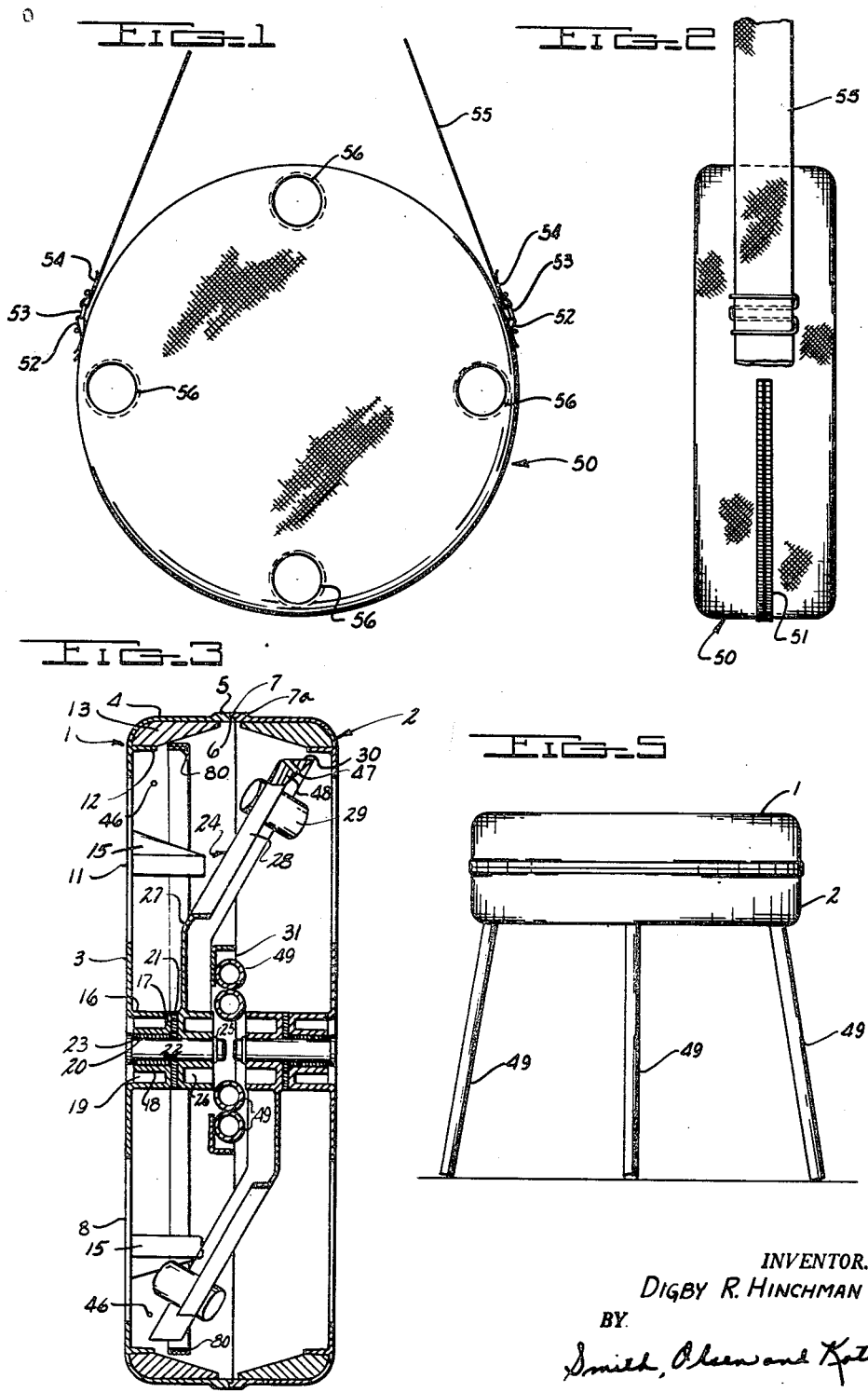

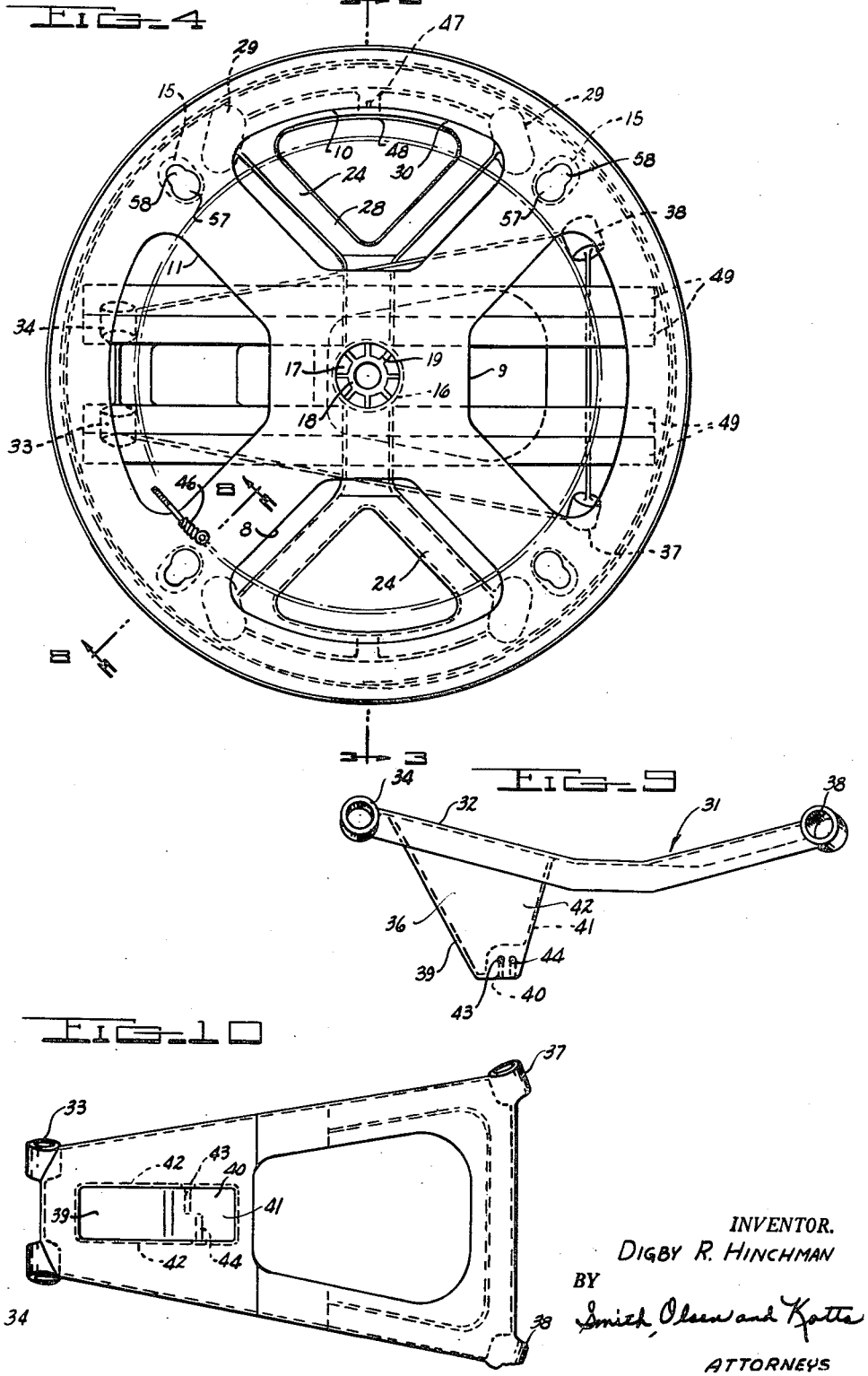

United States Patent Office 2,771,299
Patented Nov. 20, 1956

2,771,299

COMBINATION STOOL AND GAME CARRYING DOLLY FOR HUNTERS

Digby R. Hinchman, Rochester, Mich.

Application April 22, 1954, Serial No. 424,851

6 Claims. (Cl. 280—30)

This invention relates to a collapsible utility cart, and more particularly to a combination hunter's stool and game-carrying dolly.

Very often a deer hunter will wait in the area near a clearing or adjacent a runway for hours before he will see a deer. If he sits down on the ground during this waiting period, he may be out of position for seeing the deer and in poor position for shooting the deer if he does see it. If the hunter stands during the waiting period he quickly tires, thereby taking much of the joy out of his hunting.

Another problem which confronts the deer hunter is that of moving the deer carcass out of the hunting area after the deer has been killed. A deer carcass will usually weigh at least one hundred twenty-five pounds so that the problem of hauling it away is not a simple one.

An object of this invention is to provide a piece of equipment which the hunter can use as a stool in lieu of sitting on the ground or standing.

Another object is to provide the stool as a light weight article which may be knocked down into a relatively small and compact form for easy carrying during the time which the hunter spends in traveling to the hunting area.

Another object of this invention is to provide a piece of equipment which the hunter can use as a dolly for supporting a deer carcass while it is being transported out of the hunting area.

A further object is to form the dolly as an article which may be knocked down into compact form for easy carrying during the period before it is needed to carry the deer carcass, it being appreciated that the average hunter will not carry a bulky unit into the hunting areas.

A further object is to provide a two wheel dolly with a relatively wide carriage while still maintaining the distance between the wheels at the ground level to a minimum, whereby the cart can be used on the relatively narrow foot paths found in the deer hunting areas.

Another object is to provide a dolly in which any load thereon will tend to force the wheels to a vertical position instead of buckling them, thereby minimizing the chances of the dolly breaking down in use.

Another object is to provide a dolly with toed-in wheels for easy steering over the rough and soft terrain usually encountered in the hunting areas.

A further object is to provide a single piece of equipment which can be converted for alternate use as a stool or game supporting dolly.

Other objects of this invention will appear in the following description and appended claims, reference being had to the accompanying drawings forming a part of this specification wherein like reference characters designate corresponding parts in the several views.

In the drawings:

Figure 1 is a front view of a carrying case used to house the piece of equipment in collapsed position.

Figure 2 is an end view of the carrying case shown in Figure 1.

Figure 3 is a sectional view of the piece of equipment taken on line 3—3 of Figure 4.

Figure 4 is a front view of the piece of equipment in collapsed position for insertion in the carrying case.

Figure 5 is an elevational view of the piece of equipment as it appears when set up as a stool.

Figure 6 is a partial front view of the piece of equipment showing one half thereof as it appears when set up to form a dolly.

Figure 7 is a partial plan view of the dolly taken in the direction of arrow A in Figure 6.

Figure 8 is a sectional view taken on line 8—8 in Figure 4.

Figure 9 is a side view of a cradle member used when the piece of equipment is set up as a dolly.

Figure 10 is a plan view of the cradle shown in Figure 9.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings in greater detail the assembly will be seen to include a pair of wheel-forming discs 1 and 2 conveniently formed in a die casting operation. Since the discs are duplicates of each other in most respects a description of one will suffice for a description of the other.

As seen in Figure 3, disc 1 is comprised of a flat circular body member 3 and a peripheral flange 4. At its outer edge flange 4 is formed with a thickened area 5 to provide sufficient surface for the formation of a notch 6 and lip 7. In order that notch 6 of disc 1 will have a good fit with its mating lip 7A on disc 2, the notch is formed for portions of its length on the outer face of thickened area 5 (as shown at the bottom of Figure 3) and for alternate portions thereof on the inner face of thickened area 5 (as shown at the top of Figure 3).

In an effort to reduce the weight of the unit, body member 3 has four triangular areas cut therefrom as indicated by numerals 8, 9, 10 and 11 (see Figure 4). The wall thickness of body member 3 and peripheral flange 4 can be kept to a minimum to further reduce the weight of the unit by providing an endless reinforcing flange 12 near the periphery of the body member, and a series of short radial flanges 13 connecting flange 12 with peripheral flange 4. Referring to Figure 8, in the areas between each of the cut out areas 8, 9, 10 and 11 are provided a pair of parallel reinforcing ribs 14, each pair of ribs having therebetween a socket member 15 formed integrally with body member 3.

Projecting away from the plane of body member 3 (Figure 3) is a tubular flange 16 leading to annular plate 17, from which there extends a second tubular flange 18 having a plurality of radial reinforcing walls 19 interconnected with flange 16. Received within tubular flange 18 in a press fit relation therewith is a tubular bushing 20, at one end of which there is provided thrust washer 21.

Axle 22, having enlarged head 23 thereon, is rotatably mounted within bushing 20, and serves to mount bracket 24 for rotatable movement relative to disc 1. Snap ring 25 locks the bracket on the axle.

As can be seen in Figure 3, bracket 24 includes a double wall sleeve construction (indicated by numeral 26) similar to the sleeve construction comprised of walls 16, 17, 18 and 19 previously described. Extending radially from sleeve construction 26 is an arm 27, to the free end of which there is attached a pair of diverging bar members 28 leading to a pair of socket members 29, interconnected by a third bar member 30. It will be noted that the bracket is reinforced by a series of flanges extending along the arm and bar members at right angles to the plane of the bracket.

Loosely and removably positioned adjacent bracket 24 is a die cast cradle 31, shown to best advantage in Figures 9 and 10, and comprising a dished plate 32, the four corners of which are provided with socket-forming lugs 33, 34, 37 and 38. Extending downwardly from the forward portion of the cradle is a relatively deep but narrow protrusion 36 having a declined front wall 39, thickened bottom wall 40, back wall 41 and side walls 42. Two threaded bores 43 and 44 are provided in bottom wall 40 to receive the threaded end portions 45 of flexible tie rods 46, one of which is shown in Figure 6. The opposite end of each tie rod is threaded for reception in threaded bore 47 cut in rib 48 which is formed as an integral part of bracket 24.

Referring again to Figure 3, there are provided four tubular struts 49 fitting loosely alongside of cradle 31. When the unit is to be converted into a dolly, struts 49 are positioned in the various sockets 29, 33, 34, 37 and 38 as shown in Figure 7, and the tie rods are turned into position between bracket 24 and cradle 36 as shown in Figure 6, whereby struts 49 are prevented from working out of sockets 29, 33, 34, 37 and 38. It is contemplated that other means than tie rods could be employed to secure the struts in place.

The cylindrical carrying case shown in Figures 1 and 2 comprises the bag body 50, around the periphery of which there extends a zipper 51 for slightly more than one hundred eighty radial degrees. Loops 52 are provided at opposite sides of the bag for receiving clips 53, one leg of each clip being adapted to engage the looped end 54 of carrying strap 55. The bag body is provided with four openings 56 having their axes in alignment with the axes of socket members 15.

It is contemplated that discs 1 and 2 could, if desired, be releasably retained in the Figure 3 position without using a carrying case, in which event strap 55 would be attached directly to the discs.

Before the hunter begins his hunting, he will place the cradle 31 and struts 49 together with tie rods 46 and strap 80, between discs 1 and 2 as shown in Figure 3, after which the two discs will be inserted as a unit into bag body 50 for convenient carrying until the unit is needed.

When the hunter arrives at the desired hunting location, he can utilize the unit as a stool for resting himself while waiting appearance of the game. All that is needed to convert the unit into a stool is to remove discs 1 and 2 from the carrying case, separate the discs, remove struts 49 from therewithin, reinsert the discs into the case and extend the struts through openings 56 into the enlarged portions 57 (Figure 4) of socket members 15, after which said struts may be pulled outward into a snug fit relation with reduced portions 58 as shown in Figures 4 and 5.

If the hunter should be successful, for example, if he should kill a deer, the unit may easily be converted into a dolly for carrying the carcass out of the hunting area. In converting the unit from its use as a stool to its use as a dolly, struts 49 are disengaged from socket members 15, discs 1 and 2 are removed from the carrying case, and the ends of the struts are placed in the various socket members 29, 33, 34, 37 and 38 as shown in Figure 7, after which the ends of tie rods 46 are threaded into the various bores 43, 44, and 47, as shown in Figure 6, for the purpose of rigidly uniting bracket 24, struts 49 and cradle 31 together. The carcass of the dead deer may then be moved into the dolly and strapped thereon with strap 80 shown coiled around socket members 15 within the inner periphery of disc 1 (see Figures 3, 4 and 8). After the carcass has been strapped onto the dolly it may be hauled where desired, either by the use of strap 55 as a towing medium or by using the horns of the deer as a towing and steering medium.

The discs 1 and 2 have a fifteen degree camber with the vertical in the operative position as shown in Figure 6. This is particularly advantageous in a number of respects, one of which is the relatively small distance between discs at the ground line achieved thereby. The clear spaces or paths over which the dolly must be towed are often narrow. Hence the small distance between discs achieved with the instant construction, without sacrificing dolly width, will aid in maintaining the dolly on the narrow paths and out of contact with underbrush or the like.

Another advantage resident in the camber of the wheels is that when a load is applied on the cradle and struts, as when a deer is moved thereon, it will tend to force the wheels up to a vertical position instead of buckling them as would be the case if there were no camber.

The discs 1 and 2 also have a ten degree toe-in with the horizontal as shown in Figure 7. This is advantageous in that easy steering of the dolly results therefrom. It will be appreciated that a one hundred twenty-five pound deer presents quite a load for the dolly in its movement over the rough and sometimes soft terrain which is encountered in the hunting areas. It is therefore essential that the cart be capable of being easily steered when loaded.

During the foregoing description the dolly has been described with relation to its use as a medium for carrying a slain deer. It will be appreciated, however, that other forms of game could be carried thereby.

Having thus described my invention, I claim:

1. A combination stool and game carrying dolly comprising a pair of peripherally flanged wheels; axle means therefor; cradle means of lesser length than the diameter of said wheels and of less thickness than the combined axial dimension of both wheel flanges; strut means of lesser length than the diameter of said wheels; said cradle means having portions thereof releasably engaged with end portions of said strut means; bracket means extending from said axle means and having portions releasably engaged with the other end portions of said strut means; means releasably locking said strut means in positions between the cradle means and bracket means; one of the wheels having portions thereof formed to releasably engage end portions of the strut means and retain the strut means approximately parallel to the wheel axis; whereby said cradle means may be positioned within and between said wheels in disengaged relation for transportation purposes when said wheels have their flanges engaged, and said strut means may be releasably secured on the one of said wheels in order to utilize said wheel in the formation of a stool.

2. A combination stool and game carrying dolly comprising a pair of peripherally flanged wheels; axle means therefor; bracket means on said axle means extending at an angle to the planes of the wheels; cradle means of lesser length than the diameter of said wheels and of lesser thickness than the combined axial dimension of both wheel flanges; strut means of lesser length than the diameter of said wheels; said cradle means having portions thereof releasably engaged with end portions of said strut means; said bracket means having portions releasably engaged with the other end portions of said strut means; means releasably locking said strut means in positions between the cradle means and bracket means; one of the wheels having portions thereof formed to releasably engage end portions of the strut means and retain the strut means approximately parallel to the wheel axis; whereby said cradle means may be positioned within and between said wheels in disengaged relation for transportation purposes when said wheels have their flanges engaged, and said strut means may be releasably secured on the one of said wheels in order to utilize said wheel in the formation of a stool; the angle taken by said bracket means serving to give a camber to each of said wheels.

3. A combination stool and game carrying dolly comprising a pair of peripherally flanged wheels; axle means therefor; bracket means on said axle means; a cradle of lesser length than the diameter of said wheels of lesser thickness than the combined axial dimension of both wheel flanges, and of lesser width at its front end than at its rear end; a plurality of equal length struts of lesser length than the diameter of said wheels; said cradle having portions thereof releasably engaged with end portions of the struts; said bracket means having portions releasably engaged with the other end portions of said struts; means releasably locking said struts in positions between the cradle and bracket means; one of the wheels having portions thereof formed to releasably engage end portions of the struts and retain the struts approximately parallel to the wheel axis; whereby said cradle may be positioned between said wheels in disengaged relation for transportation purposes when said wheels have their flanges engaged; and said struts may be secured on the one of said wheels in order to utilize said wheel in the formation of a stool, or said struts may be secured between said bracket means and the front and rear ends of said cradle in order to utilize the wheels, cradle and strut means as a game-carrying dolly, the difference in width of the cradle's front and rear ends serving to toe in said wheels for easy steering thereof.

4. A game carrying dolly comprising a pair of peripherally flanged wheels; axle means therefor; cradle means of lesser length than the diameter of said wheels and of lesser thickness than the combined axial dimension of both wheel flanges; strut means of lesser length than the diameter of said wheels; said cradle means having portions thereof releasably engaged with end portions of said strut means; bracket means extending from said axle means and having portions releasably engaged with the other end portions of said strut means; means releasably locking said strut means in positions between the cradle means and bracket means; whereby said cradle means may be positioned within and between said wheels in disengaged relation for transportation purposes when said wheels have their flanges engaged.

5. A game carrying dolly comprising a pair of peripherally flanged wheels; axle means therefor; bracket means on said axle means extending at an angle to the planes of the wheels; cradle means of lesser length than the diameter of said wheels and of lesser thickness than the combined axial dimension of both wheel flanges; strut means of lesser length than the diameter of said wheels; said cradle means having portions thereof releasably engaged with end portions of said strut means; said bracket means having portions releasably engaged with the other end portions of said strut means; means releasably locking said strut means in positions between the cradle means and bracket means; whereby said cradle means may be positioned between said wheels in disengaged relation for transportation purposes when said wheels have their flanges engaged; the angle taken by said bracket means serving to give a camber to each of said wheels.

6. A game carrying dolly comprising a pair of peripherally flanged wheels; axle means therefor; bracket means on said axle means; a cradle of lesser length than the diameter of said wheels, of less thickness than the combined axial dimension of both wheel flanges, and of lesser width at its front end than at its rear end; a plurality of equal length struts of lesser length than the diameter of said wheels; said cradle having portions thereof releasably engaged with end portions of the struts; said bracket means having portions releasably engaged with the other end portions of said struts; means releasably locking said struts in positions between the cradle and bracket means; whereby said cradle may be positioned between said wheels in disengaged relation for transportation purposes when said wheels have their flanges engaged.

References Cited in the file of this patent

UNITED STATES PATENTS

| | | |
|---|---|---|
| 1,103,486 | Cobb | July 14, 1914 |
| 1,429,756 | Mitchell | Sept. 19, 1922 |
| 2,174,661 | Hope et al. | Oct. 3, 1939 |
| 2,417,727 | Battle | Mar. 18, 1947 |
| 2,442,552 | Seay | June 1, 1948 |
| 2,590,178 | Jamison | Mar. 25, 1952 |